United States Patent [19]
Kimball

[11] Patent Number: 5,862,474
[45] Date of Patent: Jan. 19, 1999

[54] PROGRAMMABLE WIRELESS MODEM

[75] Inventor: Robert H. Kimball, San Diego, Calif.

[73] Assignee: Qualcomm Incorporated, San Diego, Calif.

[21] Appl. No.: 694,053

[22] Filed: Aug. 8, 1996

[51] Int. Cl.[6] ............................................. H04Q 7/20
[52] U.S. Cl. ...................... 455/418; 455/550; 455/557; 455/575; 455/90; 379/93.28; 375/222
[58] Field of Search .................................. 455/403, 418, 455/419, 420, 550, 556, 557, 575, 90; 379/93.28, 93.31, 93.32, 93.34; 375/222

[56] References Cited

U.S. PATENT DOCUMENTS

| | | | |
|---|---|---|---|
| 5,155,860 | 10/1992 | McClure | 455/418 |
| 5,170,470 | 12/1992 | Pindar et al. | 379/93.28 |
| 5,249,218 | 9/1993 | Sainton | 455/418 |
| 5,257,412 | 10/1993 | Tomioka et al. | 455/418 |
| 5,297,192 | 3/1994 | Gerszberg | 455/419 |
| 5,315,638 | 5/1994 | Mukari | 455/418 |
| 5,367,563 | 11/1994 | Sainton | 455/418 |

*Primary Examiner*—Curtis A. Kuntz
*Assistant Examiner*—Nay Maung
*Attorney, Agent, or Firm*—Russell B. Miller; Charles D. Brown

[57] ABSTRACT

A wireless modem which enables user programming of radiotelephone features such as call waiting, MIN selection, and the like, without requiring a keypad interface. The wireless modem is comprised of decoder logic that determines if commands are present in a data stream from a computer. If commands are present, the decoder instructs a multiplexer to switch the modem commands to the modem subsystem and the radiotelephone feature commands to the radiotelephone subsystem. Each subsystem is comprised of a register that stores the command. The control logic in each subsystem then reads the command and acts upon it accordingly.

3 Claims, 2 Drawing Sheets

PROGRAMMABLE WIRELESS MODEM

BACKGROUND OF THE INVENTION

I. Field of the Invention

The present invention relates to wireless communications. More particularly, the present invention relates to a novel and improved method and apparatus for communicating with a programmable wireless modem.

II. Description of the Related Art

As computers have gotten smaller and become increasingly portable, they have been taken out of the home, office, and school to various on the road assignments. In order to remain in contact with other computers, such as a computer network, or to communicate e-mail to other computers, the portable computers typically use modems (modulators/demodulators). The modem translates the digital signals from the computer to analog signals for transmission on an analog telephone network, and also demodulates the received analog telephone network signals into a digital form usable by the computer. However, in the broadest sense, a modem may modulate and demodulate information to and from any predetermined communication formats, whether they be digital or analog in nature. It is in this broadest sense that the word "modem" is intended to be used in the present invention.

A portable computer must be able to keep in contact with other computers without having to be physically connected to a standard hardwired telephone line. This portability is accomplished by connecting the computer modem to a wireless radio frequency (RF) transceiver. One form of such a wireless transceiver is a cellular radiotelephone. A number of competing cellular systems are now available. These include the analog advanced mobile phone system (AMPS), time division multiple access (TDMA), and code division multiple access (CDMA), the last two systems being digital systems. CDMA provides a distinct advantage in cellular data communications. A radiotelephone, however, can be bulky and unwieldy to connect to a computer. Since the user interface portion of the radiotelephone is not strictly necessary for computer data communication, the portion of the radiotelephone utilized in the subject invention can be made much more compact and portable by eliminating hardware, such as the keypad, display, battery, microphone and speaker. Such a reduction in bulk makes it possible to fit the components of a radiotelephone onto a circuit card (such as PCMCIA) that is inserted in a computer's I/O slot, or is directly built into the computer.

The drawback of not having a user interface on the radiotelephone is the inability to program many user-specific features of the radiotelephone that are normally programmed by entering a specific key sequence on the keypad. These features may include, for example, switching between Mobile Identification Numbers (MINs) to avoid roaming charges, storage of phone numbers, call forwarding, call waiting, and long dual tone multiple frequency (DTMF) tones to access certain answering machines. There is a resulting need for a way to program these types of features into a small portable wireless modem communication system. Currently, integrated modem systems can't receive phone-related commands required for radio communication. The present invention allows for a continuous communication link for applications where land telephone lines cannot be used or become inoperative or unreliable.

SUMMARY OF THE INVENTION

The present invention is a novel and improved system and method for communicating with a programmable wireless modem. In one embodiment of the present invention, the modem is coupled to a computer that generates a single integrated data stream containing a plurality of phone and modem data. The wireless modem has a modem subsystem and a radiotelephone subsystem. The data stream is decoded to determine which of the plurality of commands are modem commands and which are radiotelephone commands. The decoded commands are then stored in the appropriate registers. The modem commands are stored in a set of modem registers and the radiotelephone commands in a set of radiotelephone registers.

Modem logic in the modem subsystem reads the modem registers and interprets the modem commands. The modem subsystem then takes appropriate action in response to the modem commands. Radiotelephone logic in the radiotelephone subsystem reads the radiotelephone registers and interprets the radiotelephone commands. The radiotelephone subsystem then takes appropriate action in response to the radiotelephone commands. Thus, the present invention provides for a way to program user-specific types of radiotelephone features into a small portable wireless modem communication system.

The modem subsystem sends and receives data to and from the radiotelephone. The radiotelephone accepts the data and transmits it to other telephones and therefrom to other computers.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The wireless modem of the present invention is programmable by a computer without the need for a typical radiotelephone user interface of a keyboard and display. The computer sends commands to the wireless modem that then interprets the type of command and acts on it accordingly.

Figure 1:
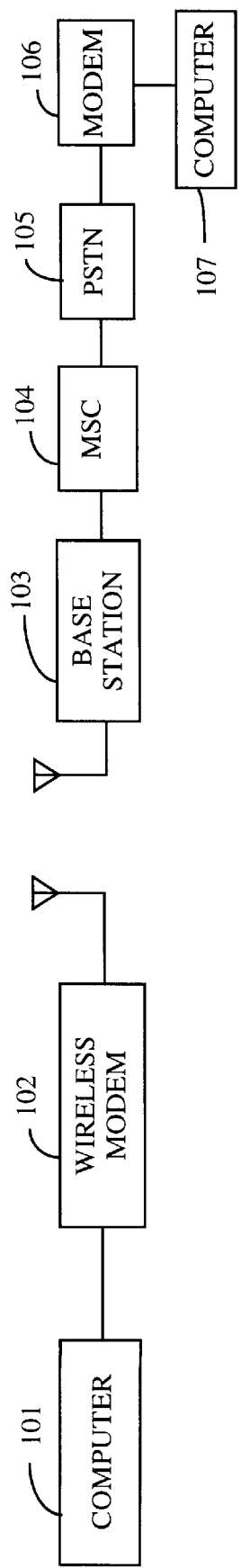
FIG. 1 is a block diagram of a computer and wireless modem in combination with a base station and computer network.

A computer 101 coupled to the wireless modem 102 of the present invention is illustrated in FIG. 1. The computer can be a typical laptop computer such as an Apple Macintosh or an IBM compatible. In the preferred embodiment, the wireless modem 102 is connected to the computer's serial interface port. In alternate embodiments, the modem 102 is connected directly to the computer's processor bus or through an infrared connection, or otherwise coupled.

The computer 101 transmits data to the wireless modem 102. This data can be in the form of information to be transmitted by the modem 102 or a data stream containing a number of commands to be interpreted and used by the modem 102. These commands include modem feature commands, such as Hayes compatible AT commands to be used by the modem such as off hook, dial, data rates, error correction, and data compression. Additionally, the data includes radiotelephone commands used by the radiotelephone of the wireless modem. Typical radiotelephone feature commands include those associated with the Number Assignment Module (NAM) of the radiotelephone, including for example, the MIN preference, system preference (i.e. AMPS, CDMA, or TDMA in the case of multiple-mode radiotelephones), and the home System Identification (SID). They also include other user-selectable service option parameters that would normally be invokable by the entry of a keypad sequence such as call forwarding.

The wireless modem 102 converts the data from the computer 101 into a form that can be transmitted over a radio frequency to a base station 103. In the preferred embodiment, the base station 103 is part of a CDMA wireless communication system. However, one skilled in the art will readily appreciate that other wireless communication systems, whether analog or digital based, are equally capable of operating with the present invention. The base station 103 may be connected, through a Mobile Switching Center (MSC) 104, to the Public Switched Telephone Network (PSTN) 105, which provides access for a remote computer 107 via a remote modem 106. The wireless modem 102, therefore, provides the computer 101 with the capability of total portability without the need for cables to connect the modem to a telephone system.

Figure 2:
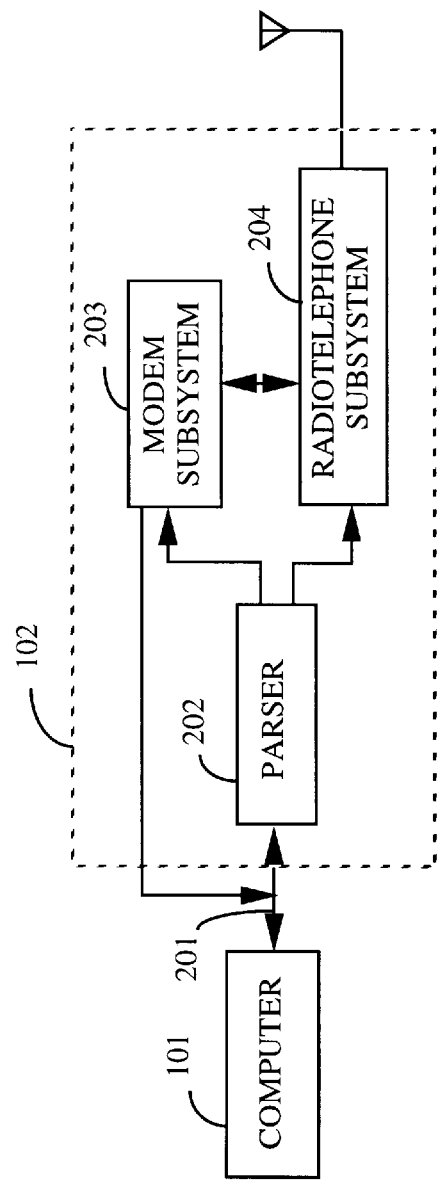
FIG. 2 is a block diagram of a preferred embodiment of a wireless modem.

The wireless modem 102 of the present invention is illustrated in more detail in FIG. 2. The modem 102 is comprised of a serial interface port 201 to couple the modem to the computer output. The data from the computer is input to a parser 202. The parser 202 first determines if the data received over the serial interface port 201 is a usable data stream.

If the data is a command stream instructing the wireless modem 102 to perform some task, the parser 202 determines which subsystem is being addressed. If the command is meant for the modem subsystem 203, the parser 202 sends the command to this subsystem 203. If the command is meant for the radiotelephone subsystem 204, the parser 202 sends the command to this subsystem 204. The respective subsystem 203 or 204 contains logic that interprets the command to determine what action to take.

If the data is a data stream to be transmitted by the wireless modem, the parser 202 sends the data to the modem subsystem 203 to be modulated. The modulated data is then sent from modem subsystem 203 to the radiotelephone subsystem 204 to be transmitted.

Figure 3:
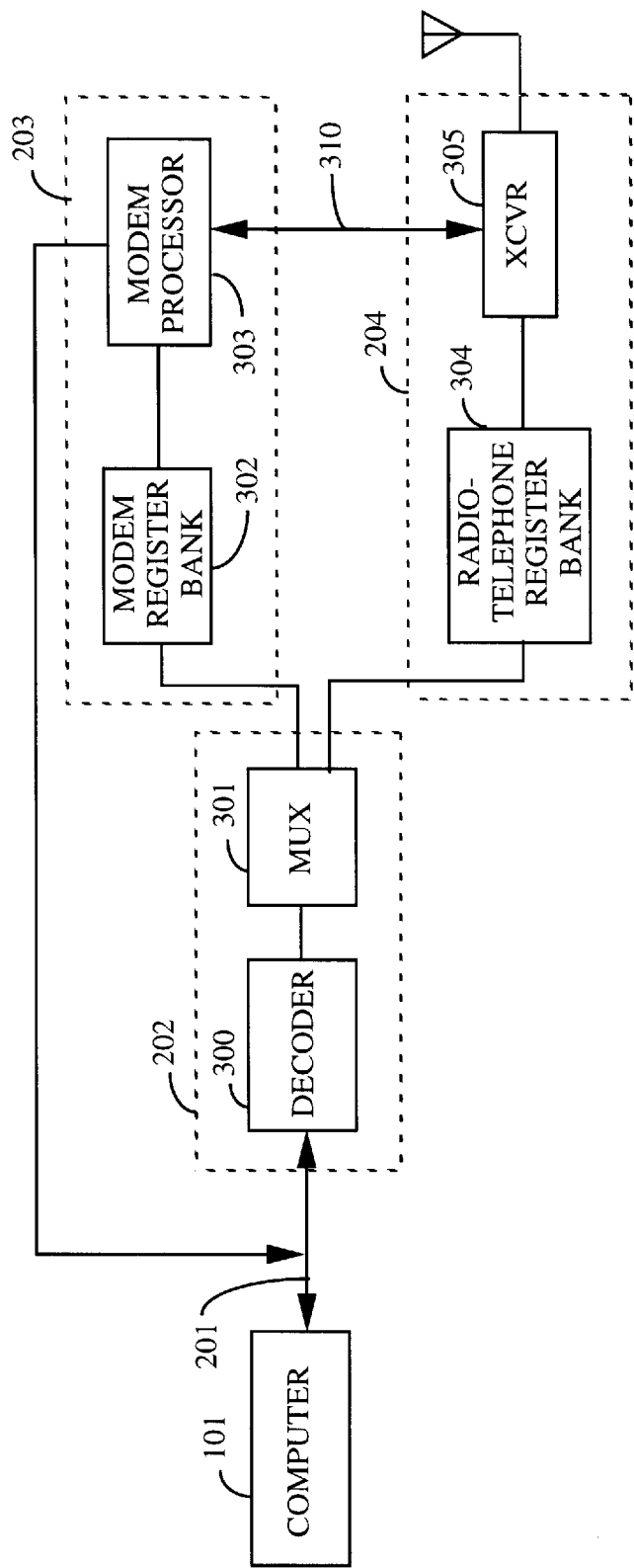
FIG. 3 is a block diagram of the command parser, modem subsystem, and radiotelephone subsystem of FIG. 2.

FIG. 3 illustrates a more detailed block diagram of the wireless modem of the present invention. The parser 202 is comprised of a decoder 300 which decodes the input data. The data is switched by the multiplexer (MUX) 301 to the proper register depending on the intended destination. The data is received by either the modem subsystem 203 or the radiotelephone subsystem 204.

The modem subsystem 203 is comprised of a modem register bank 302 for storing modem data and a modem processor 303. As described above, modem commands, such as AT commands as are known in the art, instruct the modem processor 303 to change such parameters as auto call answer, data compression protocol, data rate, and dialing. Modem commands are well known in the art and are not discussed in detail herein. The modem processor 303 contains logic that interprets and implements the commands stored in the various registers of register bank 302.

The radiotelephone subsystem 204 is comprised of a radiotelephone register bank 304 for storing the decoded radiotelephone commands. These commands may be similar in structure and nature to the AT commands used by the modem subsystem 203. The radiotelephone processor and receiver 305 reads the register bank 304 to determine which radiotelephone features are to be activated. These commands, such as call forwarding and MIN selection, are well known in the art. The radiotelephone transceiver 305 contains logic that reads, interprets, and implements the commands stored in the radiotelephone register bank 304. The modem processor 303 is coupled to the radiotelephone transceiver (XCVR) 305 over data line 310. Modulated data is passed from the modem processor 303 over data line 310 to the radiotelephone transceiver 305 for transmission.

Thus, the present invention provides a system and method for communicating with a programmable wireless modem which allows selection of service options and radiotelephone features that would normally require the entry of a keypad sequence.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for programming a wireless modem using a data stream having a plurality of commands, the wireless modem having a modem subsystem and a radiotelephone subsystem, the method comprising the steps of:

decoding the data stream to determine which of the plurality of commands are modem commands and which are radiotelephone commands;

storing the modem commands in a modem register;

storing the radiotelephone commands in a radiotelephone register;

the modem subsystem reading the modem register; and the radiotelephone subsystem reading the radiotelephone register.

2. A method for programming a wireless modem, the wireless modem being coupled to a computer and having a modem subsystem and a radiotelephone subsystem, the method comprising the steps of:

generating, in said computer, a data stream comprising a plurality of commands;

determining which of the plurality of commands are modem commands and which are radiotelephone commands;

providing the modem commands to the modem subsystem in response to said determining step;

storing the modem commands in a modem register;

providing the radiotelephone commands to the radiotelephone subsystem in response to said determining step;

storing the radiotelephone commands in a radiotelephone register;

responding, in said modem subsystem, to the modem commands; and responding, in said radiotelephone subsystem, to the radiotelephone commands.

3. A wireless modem for communicating data between an external computer system and a computer, the computer generating a data stream, the wireless modem comprising:

a decoder, coupled to the computer, for decoding the data stream into modem commands and radiotelephone commands;

a multiplexer, coupled to the decoder, for providing the modem commands to a modem subsystem and the radiotelephone commands to a radiotelephone subsystem;

the modem subsystem comprising:
- a modem register bank for storing modem commands; and
- a modem processor, coupled to said modem register bank, for reading said stored modem commands and for altering a modem parameter in response to said stored modem commands; and the radiotelephone subsystem comprising:
- a radiotelephone register bank for storing radiotelephone commands; and
- a radiotelephone transceiver for reading said stored radiotelephone commands and for altering a radiotelephone parameter in response to said stored radiotelephone commands.

* * * * *